(12) United States Patent
Tomooka et al.

(10) Patent No.: US 7,027,058 B2
(45) Date of Patent: Apr. 11, 2006

(54) HOST DEVICE, IMAGE DISPLAY DEVICE, IMAGE DISPLAY SYSTEM, IMAGE DISPLAY METHOD, PANEL ATTRIBUTE READING-OUT METHOD AND IMAGE DISPLAY CONTROL METHOD

(76) Inventors: Takatoshi Tomooka, 665-1-402 Tobaotsu, Yasu-cho, Yasu-gun, Shiga-ken (JP); Johji Mamiya, 6-20-3-901 Sagamiohno, Sagamihara-shi, Kanagawa-ken (JP); Kazushi Yamauchi, 4-7-3-402 Chuoh-Rinkan, Yamato-shi, Kanagawa-ken (JP)

( * ) Notice: Subject to any disclaimer, the term of this patent is extended or adjusted under 35 U.S.C. 154(b) by 850 days.

(21) Appl. No.: 09/725,978

(22) Filed: Nov. 29, 2000

(65) Prior Publication Data

US 2001/0006375 A1 Jul. 5, 2001

(30) Foreign Application Priority Data

Nov. 30, 1999 (JP) ................................ 11-341460

(51) Int. Cl.
*G06F 13/00* (2006.01)
(52) U.S. Cl. .................... 345/538; 345/537; 348/403.1; 382/248
(58) Field of Classification Search ............. 345/4, 345/5, 33, 30, 204, 427, 581, 1.1, 2.2, 3.2, 345/538, 537, 520, 660; 725/29, 31; 348/661; 382/248; 714/4, 18; 710/33
See application file for complete search history.

(56) References Cited

U.S. PATENT DOCUMENTS

| | | | | |
|---|---|---|---|---|
| 5,461,560 A | * | 10/1995 | Uribe ........................... 700/83 |
| 5,889,945 A | * | 3/1999 | Porter et al. ................. 709/204 |
| 5,920,342 A | * | 7/1999 | Umeda et al. ......... 348/211.14 |
| 6,031,631 A | * | 2/2000 | Tahara et al. ............... 358/296 |
| 6,178,224 B1 | * | 1/2001 | Polichar et al. ............ 378/98.2 |
| 6,335,725 B1 | * | 1/2002 | Koh et al. ................... 345/173 |
| 6,377,780 B1 | * | 4/2002 | Greenberg ................... 434/311 |
| 6,462,736 B1 | * | 10/2002 | Ross et al. ................... 345/419 |
| 6,583,771 B1 | * | 6/2003 | Furuhashi et al. ........... 345/1.1 |
| 6,778,168 B1 | * | 8/2004 | Mamiya et al. ............. 345/204 |

* cited by examiner

*Primary Examiner*—Amr A. Awad
*Assistant Examiner*—Abbas Abdulselam
(74) *Attorney, Agent, or Firm*—Thomas, Kayden, Horstemeyer & Risley

(57) ABSTRACT

To make it possible to execute the same application regardless of the number of connected panels even in a multi-panel environment. A host system, which transfers an image signal to a plurality of panels connected thereto, comprises: a panel ID recognition section for recognizing a panel ID of a single panel or a predetermined number of collected panels as a unit; a window ID allocation section for allocating a window ID to a window which is a transfer processing unit of the image signal; a control signal output section for outputting a control signal used for setting a window ID to be processed to the panel ID to be read out in transferring the image signal; and an image signal transfer section for adding the window ID allocated by the window ID allocation section to the image signal, thus transferring the image signal.

29 Claims, 12 Drawing Sheets

HOST DEVICE, IMAGE DISPLAY DEVICE, IMAGE DISPLAY SYSTEM, IMAGE DISPLAY METHOD, PANEL ATTRIBUTE READING-OUT METHOD AND IMAGE DISPLAY CONTROL METHOD

BACKGROUND OF THE INVENTION

1. Field of the Invention

The present invention relates to a video interface mechanism used when an image is displayed on a display panel, more particularly to a method of driving a plurality of display panels or a high-resolution panel, a driving device for driving the same, a display device and the like.

2. Related Art

Recently, a technology has been proposed, in which a plurality of display panels are connected to a host system such as a personal computer (hereinafter, referred to as PC) and the plurality of display panels are used as a display device constituting a large screen as a whole. At this time, according to an ordinary video interface specification, to transfer an image, one graphics controller is required for one display. For example, when it is tried to display respectively different images on four display panels, four video chips are necessary. For this reason, even though it is tried to allow a large number of display panels to display images with an ordinary video interface, there is a limitation on the number of graphics controllers that can be loaded on a PC, that is, on the number of display devices that can be connected to a PC. Only four to eight display panels at most can be connected to a PC. Accordingly, there is naturally a limitation on extension of the display panel.

Furthermore, a resolution of the display panel itself has recently advanced, and as high-resolution (ultra high-resolution) panels, such as a QXGA (Quad Extended Graphics Array) panel (2048×1536 dots) and a QUXGA (Quad Ultra Extended Graphics Array) panel (3200×2400 dots) are being put into practical use. However, system power and graphics chip power come to be incapable of following the advancement of the panel, and a sufficient display cannot be actually performed with an ultra high-resolution panel. Accordingly, as means for solving power deficiency of the graphics chip, a method in which a memory is provided on a display device side and a transfer rate is dropped to an extent that can be realized technically is conceived. However, the method cannot cope with a moving picture display and the like which require a high transfer rate. On the other hand, in order to cope with such a high-resolution display, a method in which a screen is divided and the divided screens are processed individually by a plurality of driving mechanisms is conceived. However, also in this method, in spite of existence of one panel, a host system must execute the same processing as that executed when a plurality of panels exist. Accordingly, for the similar reason to the case of the connection of the plurality of panels, an extension of the processing has been difficult.

In order to solve such problems, a technology to connect display panels in a cascade connection is proposed in Japanese Patent Laid-Open No. 11-164354. This technology adds a control signal after information of the lowermost line in the video signals of a frame, thus realizing a multi-panel in the form of a daisy chain. According to this technology, an enlarged display using a plurality of display devices in a cascade connection is enabled by a simple modification of software without a modification of hardware on the system side.

On the other hand, according to Japanese Patent Laid-Open No. 11-164354, a control signal is sent out to each panel from a host system side via a video signal line. For this reason, it is sometimes required for the host system side to execute processing relatively strongly conscious that a screen is divided into plural pieces. Moreover, in the case of the cascade connection of the panels in the foregoing application, a technical problem concerning signal deterioration due to relays of signal through the panels is left.

In the foregoing technologies, the number of panels connected is limited. At the same time, when it is tried to realize a multi-panel environment, it is difficult to execute the same operation depending on the number of panels connected. To be more specific, although it is tried to realize the multi-panel environment, there are serious limitations to the number of panels connected and a connection thereof. Moreover, it is impossible to execute any type of multi-panel application.

SUMMARY OF THE INVENTION

In view of the prior art described above, including the disadvantages and deficiencies, An object of the present invention is to make it possible to execute the same operation for an application regardless of the number of panels connected even in a multi-panel environment.

Another object of the present invention is to realize a tree-shaped multi-panel connection that has not been solved with the prior art and to enable a dynamic re-layout of the panels. To be more specific, the object of the present invention is to make it possible to deal with spread panels as one large panel or to display a copy of the same information on each spread panel.

Still another object of the present invention is to read out display attributes from a multi-panel constituted by a cascade connection or a tree-shaped connection, and to complete the multi-panel configuration with a host system automatically without performing a special setting for each display device.

Still another object of the present invention is to allow an ultra high-resolution panel to look like a single display device from a host system and to make it possible to perform a processing unconscious of a multi-panel, by controlling a plurality of driving mechanisms by a certain driving mechanism among them serving as a master when the ultra high-resolution panel is processed being divided by the driving mechanisms.

The present invention was made to achieve the foregoing objects. A first host device of the present invention, which transfers an image signal to a plurality of panels connected thereto, the host device comprising: a panel ID recognition section for recognizing a panel ID for a unit consisting of either a single panel or a predetermined number of panels collected; a window ID allocation section for allocating a window ID for a window constituting a unit for transferring the image signal; a control signal output section for outputting a control signal for setting the window ID in the panel ID which is being read out in transferring the image signal; and an image signal transfer section for the window ID allocated by the window ID allocation section, the window ID being added to the image signal.

Another host device of the present invention, which transfers an image signal to a high-resolution panel connected thereto, the host device comprising a panel ID recognition section which imagines sub-panels obtained by dividing the high-resolution panel into a predetermined number, and recognizes a panel ID for a unit consisting of a single sub-panel or a predetermined number of sub-panels collected.

The control signal output section outputs setting information of a processing space that is information relating to a display area to be processed for each unit or for a plurality of selected units, the unit having a panel ID. Thus, it is possible to allow a screen display to correspond to any position on an image space in the host device. To be more specific, the control signal output section sends out a command to a panel (sub-panel), which changes an origin of the processing space in each panel (sub-panel). Note that the setting information of the processing space includes so-called update information for changing an image space to be processed, in addition to initial setting information.

Here, the processing for the plurality of selected units can be realized by making a promise in such a way that a command for a panel ID: 0 means, for example, a broad casting for all panels. For example, as a command simultaneously issued to a plurality of panels, the one is conceived, which makes all the panels a non-display state (dead darkness) and makes them return to a display state.

Furthermore, when a multi-panel in which a plurality of panels are spread is controlled, the setting information, which is outputted from the control signal output section, is to provide a gap between end coordinates of a processing space and start coordinates of an adjacent panel. To be more specific, in consideration of a discontinuous view produced by a frame of each panel, an offset of coordinates by, for example, about 10 bits is made. With such constitution, even when the plurality of panels are spread and discontinuity occurs, discrepancy of the image can be suppressed to minimum for a user who views the image. A panel attribute setting section for setting a panel attribute for each panel ID is further provided, and the control signal output section specifies a panel ID and outputs a control signal for indicating a panel attribute set by the panel attribute setting section. The attribute information includes, panel brightness control, gamma characteristics setting, and color adjustments such as color temperature characteristic adjustment. With such constitution, the host device can execute an update of the panel attribute for a specified objective panel.

Furthermore, the image signal transfer section manages an update of the screen for each window, and packetizes an updated image signal when the update is needed. The image signal transfer section adds the window ID to the image signal and transfers the image signal. At this time, the image signal transfer section can add also control information including a window position and a window size on the screen to the image information, thus transferring the image signal.

A panel ID setting instruction section for instructing a setting of the panel ID for the panel (sub-panel) is further provided, and the panel ID recognition section recognizes the panel ID from information outputted from the panel (sub-panel) based on the instruction by the panel ID setting instruction section.

These processing may be executed in terms of software, or a part of functions is allowed to have a card and the rest thereof may be performed in terms of software. Specifically, the host device can achieve its function in terms of both of software and hardware, and does not select either.

An image display device of the present invention, which is connected to a host device for transferring an image signal and displays an image by a plurality of panels, comprises: a panel ID setting means for setting a panel ID, which is an identifier, either for a single panel or for a predetermined number of panels collected; recognition means for recognizing a correspondence relation of the panel ID and a window ID to be processed, with respect to the window ID allocated for each window that is a transfer processing unit of the image signal; and receiving means for receiving the window ID added to the image signal transferred, in which a panel processes, based on the correspondence relation recognized by the recognition means, the image signal for which a specified window ID received by the receiving means is allocated, the panel having a panel ID which corresponds to the window ID.

Here, when the image display device is a set of sub-panels obtained by dividing, for example, a high-resolution panel, panel ID setting means, which imagines sub-panels obtained by dividing a panel into a predetermined number and sets a panel ID that is an identifier either for a single sub-panel or for a predetermined number of sub-panels collected, is provided, and the sub-panel having the panel ID which corresponds to the window ID processes, based on a correspondence relation recognized by the recognition means, an image signal received by the receiving means, for which a specified window ID is allocated.

Furthermore, panel control bits for allowing the host device to recognize states of the plurality of panels are provided. Accordingly, the host device can grasp a tiling state, in which, for example, the plurality of panels are imagined as one large virtual panel by the host device. As the panel control bits, bits are mentioned, which include a Tiling bit for storing whether the panels are tiled, a TiledMaster bit indicating that a certain panel is the one communicating with the host device as a representative of the virtual panel, a TiledLast bit indicating that a certain panel is the final of the tiled panels, and a MultiConf bit indicating that the panels are re-arranged as a multi-panel constitution.

The panel (sub-panel) comprises a plurality of units (for example, handlers), each of which is capable of processing a single window. When the handler is constituted so that it has a priority information indicating an upper/lower relation at the time when the windows overlap, besides the window ID to be processed, it is preferable that a development of an image in the image display device can be suitably executed.

The number of the handlers should be optimized in consideration of the number of the windows to be processed simultaneously.

When an ultra high-resolution panel is divided into a plurality of sub-panels, a constitution, in which only one memory for storing setting information of the sub-panel set by the panel ID setting means of the sub-panel is provided in the display device, can be adopted. In this case, a plurality of processing chips, each of which drives the corresponding one of the sub-panels, are provided for the corresponding sub-panels, and the processing chips are controlled.

The present invention is grasped as an image display system which comprises a host system for executing an application and a display constituted by a plurality of panels connected to the host system. In this case, each panel in the display has a panel ID as an identifier. The host system allocates a window ID for a window that is an area making a definite sense on an image space, of which the host system is conscious, adds the window ID to an image signal, thus outputting the image signal to the display, and outputs a control signal to allow the window ID and the panel ID to correspond to each other.

Particularly, the host system packetizes the image signal before an image development, and outputs the packetized image signal. The display executes processing for developing the image signal before the image development, which is outputted from the host system. With such constitution, it is possible to optimize a quantity of working in each module and to increase a processing capability of the whole of the system.

Note that no problem occurs when the present invention is grasped assuming that the plurality of panels are one high-resolution panel and each panel is a sub-panel obtained by dividing the high-resolution panel.

On the other hand, when the present invention in a different category is grasped, the present invention is an image display method which displays an image on a display based on a signal from a host system for executing an application, comprising the steps of: setting a panel ID for identifying either a single display section or a predetermined number of display sections forming a tiling, for the plurality of display sections constituting a display; defining a window as an area which makes a sense collectively on an image space, of which the host system is conscious; allocating a window ID for the window; before transferring image information, setting a window ID to be processed, for the display section for which the panel ID is set; and transferring the image information after adding the window ID to the image information.

This display is an enlarged panel using a plurality of panels, and the display section constituting the display is a panel constituting this enlarged panel.

The display is a single high-resolution display panel, and the display section constituting the display is a sub-panel which is obtained by dividing this high-resolution display panel.

Changes of the panel ID and the window ID to be processed by the display section, for example, by the foregoing handler, are transmitted from the host system to the display by a command. Besides, a change of a panel attribute can be executed by the command. The host system which transmitted the command to the display can be constituted so as to read out error information of video data transferred from the display.

A common panel ID is set to all of the predetermined number of the display sections forming a tiling, and a common window ID is set to all of the predetermined number of the display sections. The predetermined number of tiled display sections are dealt with as one panel by the host system, and, for example, a magnification display can be executed by using the predetermined number of the display sections.

On the other hand, the present invention is grasped from a different point of view. A panel attribute reading-out method, in which a panel ID for identifying a display panel is set for the plurality of display panels connected to the host system for executing an application, and an attribute of the display panel is read out by the host system, comprises the steps of: setting the panel ID to "0" for all display panels at the time of turning on a power source; reading out attribute information of a specified display panel by the host system; setting the panel ID to a value other than "0" by using a command, for the display panel from which the attribute information is read out; by the display panel having the panel ID of "0," inhibiting the command from the host system from being sent to a downstream display panel; and by the display panel having the panel ID other than "0," selecting one of the plurality of display panels connected toward the downstream, thus transferring the attribute information to the host system. According to the panel attribute reading-out method, it is unnecessary to decide a panel ID for the first time and store the attributes of the panel ID. The panel ID can be set dynamically after addition and deletion of the panel.

The display panel having the panel ID other than "0" selects a display panel which first outputs "0," and transfers attribute information to the host system.

Furthermore, when "0" is outputted simultaneously from two or more downstream display panels to the display panel having the panel ID other than "0," one downstream display panel is selected in accordance with a priority fixed in the display panel, and attribute information is transferred to the host system.

When a plurality of display panels are tiled, attribute information is transferred from a display panel among the display panels tiled, which is closest to the host system, and a command from the host system which sets a panel ID is sent to all display panels tiled without being blocked. With such structure, the same panel ID can be dynamically given to all display panels tiled.

A constitution can be also adopted, in which the display panel is a sub-panel obtained by dividing a single high-resolution panel, the panel ID is set corresponding to the sub-panel, and an attribute corresponding to the sub-panel is read out.

On the other hand, the present invention is grasped from a different point of view. An image display control method, which controls a plurality of display panels connected to a host system for executing an application, comprises the steps of: setting a panel ID for identifying a plurality of display panels; by a host system, specifying a specified panel ID and issuing to a display panel having the specified panel ID a command to confirm that the display panel is continuously operating; and responding to a reading-out of the host system by using bits indicating that the display panel specified by the panel ID is active. With such structure, the host system can easily execute a confirmation for a connection to a specified display panel.

Here, unspecified display panels transfer simply reading-out data from the downstream to the host system side on the upper stream. The transfer of the reading-out data may be executed while computing a logical sum for the reading-out data.

Moreover, when newly added display panels exist, bits for notifying that the newly added display panels exist are made to be active to respond to the host system. Accordingly, the host system can easily grasp the existence of the added display panels. Also at this time, a transfer may be performed while making a logical sum in each display panel.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENTS

Figure 1:
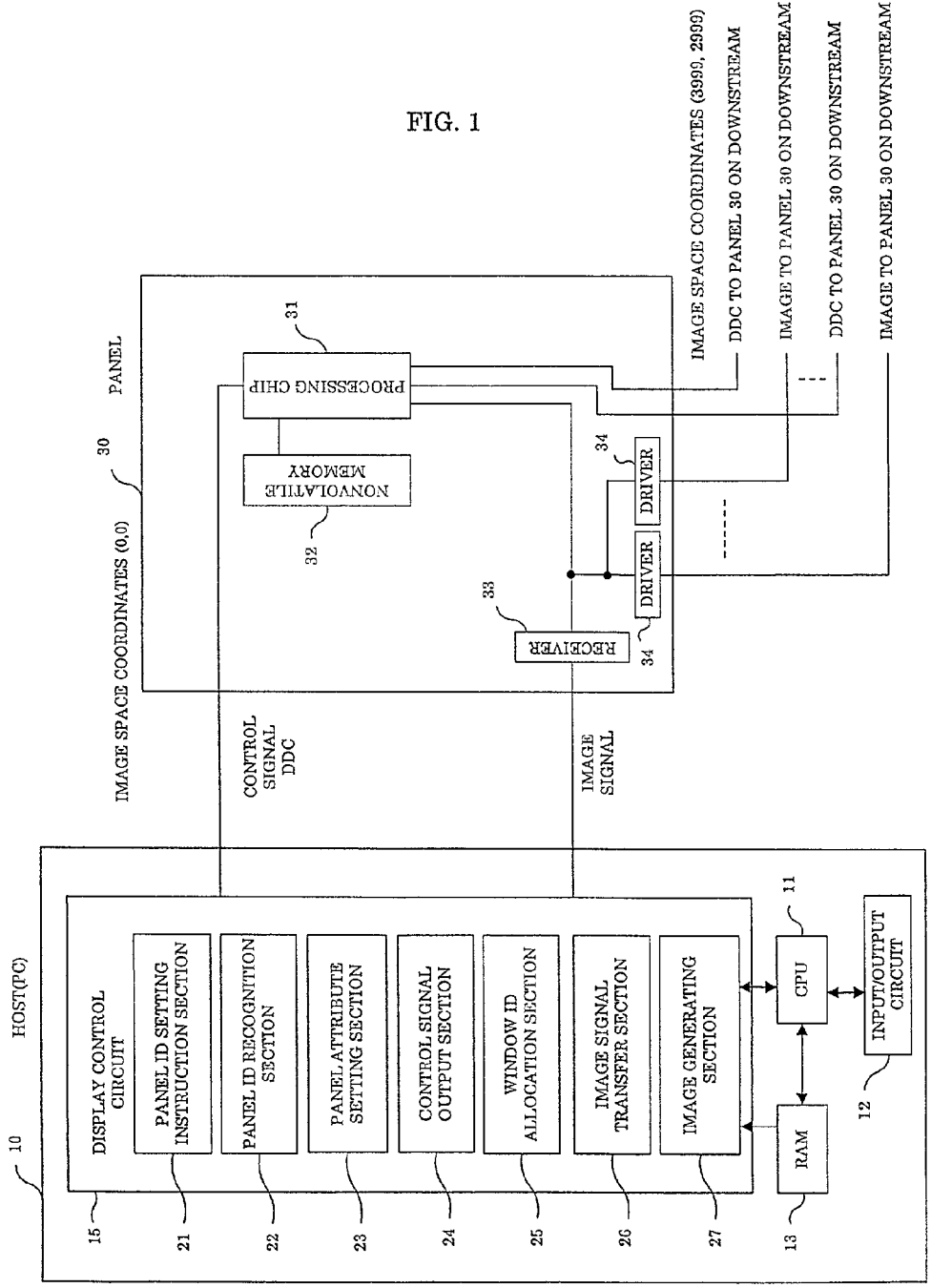
FIG. 1 is a block diagram showing an embodiment of an image display system to which the present invention is applied.

FIG. 1 is a block diagram showing an embodiment of an image display system to which the present invention is applied. Referring to FIG. 1, reference numeral 10 denotes a host system composed of a personal computer (PC) and the like, which serves as a driving device for driving a display device in this embodiment. In this host system 10, reference numeral 12 denotes an input/output circuit composed of a keyboard, a mouse and the like, and reference numeral 13 denotes a RAM composed of a hard disc, a dynamic RAM and the like, which stores data such as a video signal and the like. The video signal used for the display is generated by the host system 10 itself in this embodiment. Alternatively, the video signal generated by a device outside the host system may be taken into the host system from the outside. Reference numeral 11 denotes CPU, which executes processing of the host system based on a control program and an instruction of a user from the input/output circuit 12.

Reference numeral 15 denotes a display control circuit which is controlled by the CPU 11 and executes controls for the panel 30 connected to the host system 10. The display control circuit 15 comprises a panel ID setting instruction section 21, a panel ID recognition section 22, a panel attribute setting section 23, a control signal output section 24, a window ID allocation section 25, an image signal transfer section 26 and an image generating section 27.

The panel ID setting instruction section 21 has a function to instruct the panel 30 to set a panel ID immediately after turning on a power source. The panel ID recognition section 22 recognizes the panel ID allocated to the plurality of panels 30 by the panel ID setting instruction section 21, and gives the panel ID to the panel attribute setting section 23 and the control signal output section 24 when the panel attribute setting section 23 and the control signal output section 24 control the panels 30 individually. The panel attribute setting section 23 specifies the panel by the panel ID, thus setting the panel attribute such as a brightness control and a gamma adjustment. Moreover, the control signal output section 24 outputs a control signal for setting a window ID to be processed for the panel ID. The control signal is outputted to a handler later described. Furthermore, the window ID allocation section 25 allocates unique window IDs to the respective windows. The image signal transfer section 26 reads out an image signal stored in the RAM 13, and paketizes the image signal. The image signal transfer section 26 adds the window ID to the image signal, and transfers the image signal to the panel 30. Furthermore, the image generating section 27 executes graphics illustration forming an image itself.

On the other hand, reference numeral 30 denotes the panel composed of a liquid crystal display (LCD) as the display device, and a plurality of panels 30 are connected to each other on the downstream in a cascade fashion or a tree-shaped fashion. For example, the plurality of panels 30 are combined to construct a large screen. Here, it is also possible to recognize this panel 30 as a sub-panel obtained by dividing a high-resolution panel into plural pieces. In this case, the panel 30 shown in FIG. 1 and the plurality of panels 30 (sub-panel) connected on the downstream to each other compose a piece of panel physically. Each of the panels 30 is processed by a processing chip 31. The processing chip 31 includes a frame memory (not shown) and has information (0,0) to (3999, 2999) in the example of FIG. 1 relating to a display area to be processed by itself. Thus, the processing chip 31 is constituted so as to execute processing for an area included in this information. The processing chip includes a nonvolatile memory 32. The nonvolatile memory 32 stores necessary information for setting a panel in a processing space and the like, resetting information in the multi-panel and attribute information of the panel known as Extended Display Identification Data (EDID). When the panel 30 corresponds to one of the sub-panels of the high-resolution panel, it is only necessary that one nonvolatile memory 32 is connected to the master processing chip 31 first connected to the host system 10, and it is unnecessary to provide the nonvolatile memory 32 in all of the sub-panels. In such a case, each sub-panel has the processing chip 31 as a driving mechanism, and each setting parameter is stored in the single nonvolatile memory 32.

Each panel 30 comprises a receiver 33 for receiving an image signal (image data) packetized from the host system 10 and a driver 34 for transferring the image signal to the next panel 30 when the multi-panel is constructed.

The image signal transferred from an image signal transfer section 26 of the host system 10 is received by the receiver 33, and contents of the image signal are sent to the processing chip 31. For information exchange between the host system 10 and the panel 30, an I²C-base interface known as Display Data Channel (DDC) is provided, and a control signal is transferred through the interface between the host system 10 and the panel 30. The image signal received by the receiver 33 is sent to the panel 30 on the downstream side by the driver 34. Furthermore, another DDC extending from the processing chip 31 to the downstream panel 30 is provided to connect the host system 10 to the downstream panel 30.

In this embodiment one of the parameters that are keys to a dividual drive of the screen is a setting of a processing space. In FIG. 1, the number of pixels of the panel 30 is assumed to be 4000 pixels in the horizontal direction and 3000 pixels in the vertical direction. At this time, when the panel 30 is used as a single unit, it is common that the pixel located at the top left corner of the screen is represented as (0, 0), the pixel located at the bottom right corner of the screen is represented as (3999, 2999) and this arrangement of the pixels is made to correspond to the image space of the host system 10. However, it is possible to make the processing space correspond to any position on the image space of the host system 10 by use of a command via the DDC or by rewriting the constitution information stored in the nonvolatile memory 32.

Furthermore, to connect the plurality of panels 30 in the cascade fashion or in a tree-shaped fashion, one output or more to the downstream is provided in this embodiment, as described above. The respective output includes the image signal and the DDC for the communication with the host system 10. The outputted image signal has the same contents as the inputted information. In this embodiment, when data is transferred from the host system 10, the DDC outputs contents obtained by copying the input, thus simultaneously transferring the information to all of the panels 30 connected.

On the other hand, when various kinds of information such as a panel ID later described are transferred from the panel 30 to the host system 10, the plurality of panels 30 transfer data toward the upstream, that is, toward the host system 10. In this embodiment, one among the inputs from the panels 30 connected to each other is selected depending on contents of the information, for example, at the time of reading out the EDID information. Moreover, the image display system of the present invention is constituted so that it can execute a processing that inputs from the plurality of panels are transferred while totalizing information by a logic processing of the inputs such as logical sum when, for example, error information is read out as the contents of the information.

The single panel 30 is recognized as one display device by the host system 10 in this embodiment, or the plurality of panels 30 are recognized as one display device provided for the host system 10, which is constructed by tiling the plurality of the panels 30.

This embodiment has a feature in that the individual panel 30 has an identifier called a panel-ID. The panel-ID is set to "0" immediately after a power is tuned on. When an instruction to set a panel-ID by the panel ID setting instruction section 21 is received, the panel-ID is set to the corresponding panel 30, and the panel-ID set to the panel 30 is the identifier thereof. The panel ID recognition section 22 in the host system 10 recognizes the panel ID of each panel 30 via the panel 30 located at the uppermost stream side. The panel attribute setting section 23 in the host system 10 specifies an objective panel 30 by using a panel-ID of this panel 30, and thus the panel attribute setting section 23 can execute an update of the attribute (brightness, gamma setting and the like) of the panel 30.

On the other hand, the panel-ID of the panel 30 is specified from the host system 10, and an image space to be processed by the specified panel 30 is changed. Thus, a display space constituted by tiling many panels can be displayed. In changing the image space, a change command from the host system 10 is used, and a MultiConf bit indicating that the image space is changed, and coordinates of a new space changed are stored in the nonvolatile memory 32. Thus, a display for the new space changed can be resumed at the time when the image display system is started for the next time. At this time, when one panel 30 is driven by the plurality of processing chips, a processing space needs to be set for each sub-panel corresponding to a display area to be processed by each of the processing chips. In such a case, information which is obtained by adding a space change for the panel 30 to a processing space information for the sub-panel stored in the nonvolatile memory 32 of each panel 30 is sent to each sub-panel.

In the case where the multi-panel is constituted in the above described manner, the host system 10 manages several sheets of the panels 30. When the plurality of panels 30 may be dealt with as a single panel 30 under conditions where the layout of the multi-panel is formed invariably, it is possible to allow the host system 10 to recognize the multi-panel as a single panel 30 by use of a technique called tiling. In this embodiment, when the plurality of panels 30 are combined by this tiling technique to form one large virtual panel, the individual panels 30 that are constituent components constituting the multi-panel have a common panel-ID. With such constitution, the host system 10 can regard this virtual panel as one sheet of panel 30. When the virtual panel is regarded as one sheet of a display device by constructing the multi-panel using the tiling technique, the common panel-ID is given to the panels 30 constituting the multi-panel. Moreover, the multi-panel by tiling is realized by use of a later-described control information.

Note that each of the above-described processing may be performed in terms of software, or a part of functions is allowed to have a card and the rest thereof may be performed in terms of software.

Figure 2:
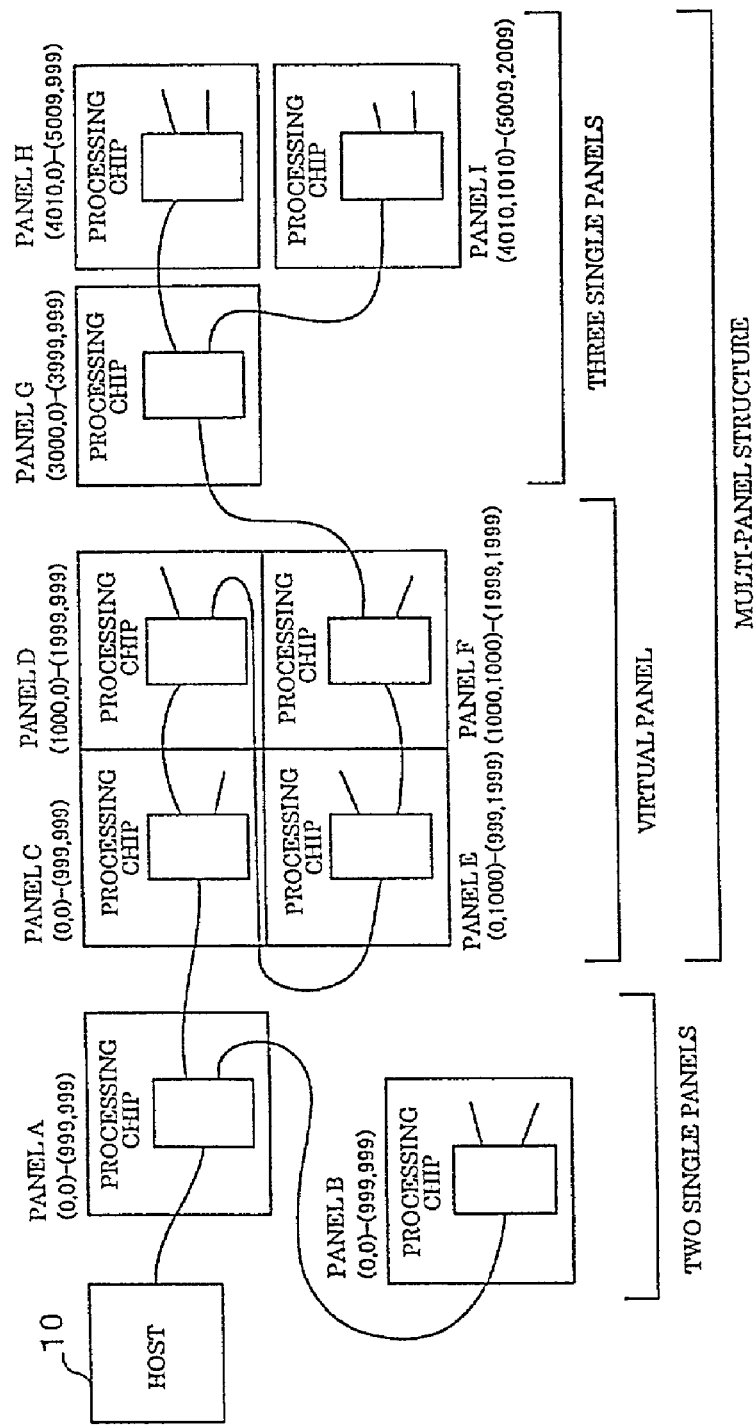
FIG. 2 is a diagram showing a constitution example of a multi-panel (a plural panel) in which panels are partially tiled.

FIG. 2 shows a constitution example of the plurality of panels including tiled panels. Panels A to I have the same constitution as that of the panel 30 shown in FIG. 1. Here, the panels A and B are recognized as a single panel, and have the common image space, (for example, (0, 0) to (999, 999)). The four panels C, D, E and F form the tiling so as to be recognized as one sheet of panel. Therefore, an image space is constituted in such a manner that the four panels are continuous from, for example, (0, 0) to (1999, 1999). In other words, the four panels form one large image space.

The panels G, H and I are respectively recognized as a single panel. However, upon receipt of an instruction to change a display area, the panels G, H and I are instructed to display an area adjacent to the right side of the virtual panel C, D, E and F, and the image space of the panel G starts from (3000, 0). Moreover, the panels G, H and I form an image space having a gap in consideration of existence of a discontinuous area of about 10 dots caused by fringes of the panels. For example, a completion x-coordinate of the panel G is 3999, and a start x-coordinate of the panel H adjacent to the panel G is 4010. Similarly, a completion y-coordinate of the panel H is 999, and a y-coordinate of the panel I adjacent to the panel H starts from 1010. In this embodiment, when a display on the screen is discontinuous by the external frame of the panel, a gap is provided between the completion coordinate and the starting coordinate in setting the processed space, so that a natural display can be realized.

Furthermore, each panel 30 has one or more processing mechanism, and a wiring for transferring an image and a wiring such as a DDC for exchanging control information are provided in each panel 30.

Figure 3:
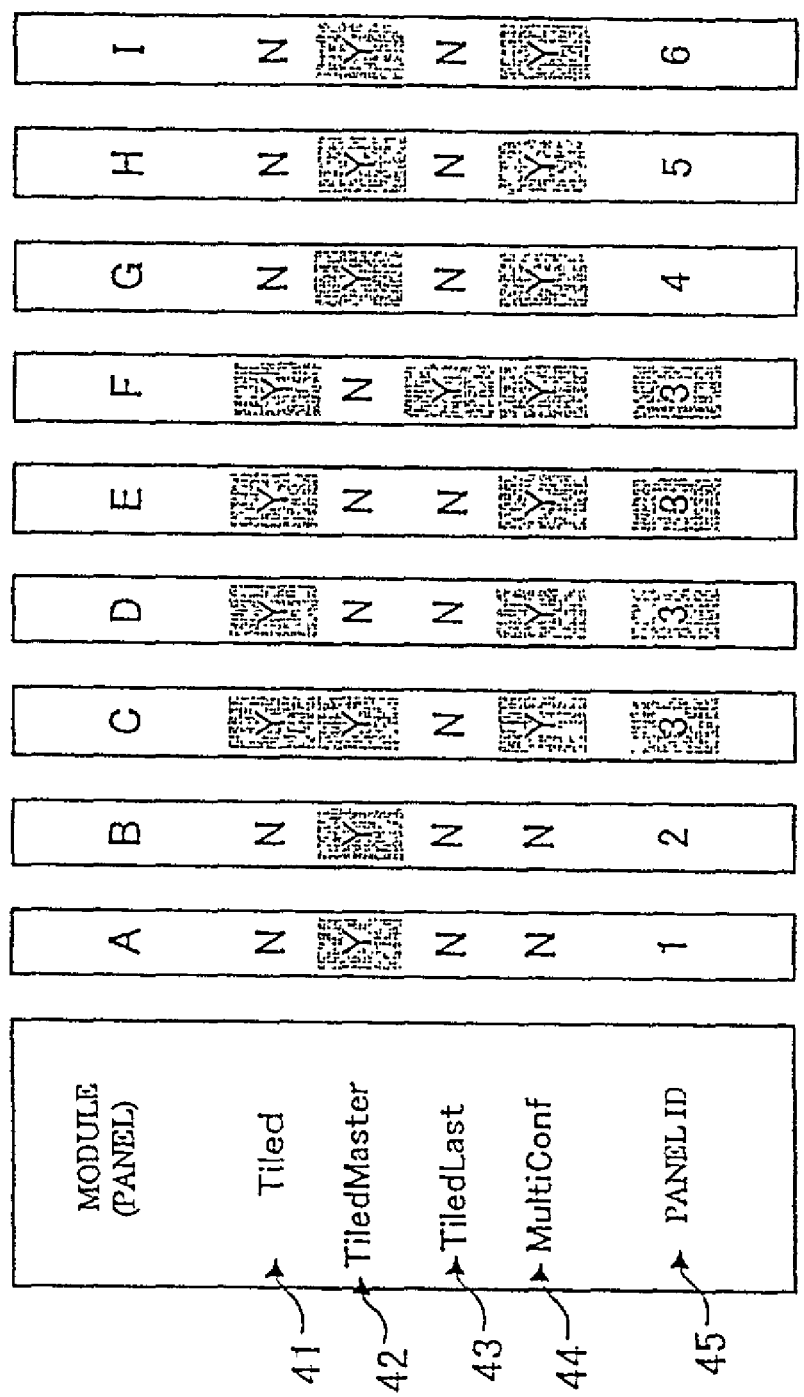
FIG. 3 is a diagram showing a setting example of control information (control parameter) when a multi-panel (a plural panel) is constituted while including tiled panels.

FIG. 3 shows a setting example of the control information (control parameter) in the case where the plurality of panels including tiled panels are constituted. Modules (panels) A to I are illustrated so as to correspond to the panels A to I shown in FIG. 2. The control information includes a Tiled bit 41 for storing whether panels are tiled, a TiledMaster bit 42 indicating that a certain panel is the one communicating with the host system 10 as a representative of the virtual panel, a TiledLast bit 43 indicating that a certain panel is the final of the tiled panels daisy-chained, and a MultiConf bit 44 indicating that the panels are re-arranged as a multi-panel constitution, in addition to a panel ID 45. Each panel 30 stores bit information in its nonvolatile memory 32 shown in FIG. 1, respectively, and manages these bits.

Since the virtual panels C, D, E and F are recognized as one sheet of panel by the host system 10, the Tiled bit 41 is set to "Y", that is "1". These panel IDs 45 have a common panel "ID: 3". Among these panels C, D, E and F, with reference to the panel C, the TiledMaster bit 42 indicating that the panel C is the representative of the virtual panel is set to "Y", that is "1" in the top of the tiling, in order to respond to reading-out of information (for example, reading-out of EDID information) from the host system 10. At this time, in the single panels other than the panels C, D, E, and F, the TiledMaster bits 42 are set to "Y", that is "1" so that all the single panels can respond to the reading-out. Moreover, in the panel F that is the final panel in tiling, the TiledLast bit 43 is set to "Y", that is "1".

The panels G, H and I are dealt with as a single panel, respectively. The panels G, H and I have separate panel IDs 45 such as "4", "15", and "6", respectively. Because the processed image space is changed from that at the time when the panels are dealt with as a single panel, a MultiConf bit 44 is set to "Y", that is, "1". When this MultiConf bit 44 is "1", a standard image space in which a coordinate of its top left corner is (0, 0) is not set, but an image space for constituting the multi-panel, which corresponds to any location, shall be set. Also when the panels are tiled, the same parameters as those for constituting the multi-panel are used. In both constitutions, one in which the panels are tiled and the other in which each of the panels is dealt with as a single panel and then the multi-panel structure is constituted, an image space in which the panels are spread can be obtained. However, when the panels are tiled, the tiled panels are easily dealt with as one sheet of panel. On the other hand, when the multi-panel is formed, an attribute of each panel is freely changed independently. It is possible to select one of the multi-panel and the tiled panels suitably depending on an application.

The panels A and B are dealt with as a single panel, respectively, and have separate panel IDs 45 that are "1" and "2". Since the panels A and B do not constitute a multi-panel, the panels A and B correspond basically to the same image space in which the top left corner is (0, 0), as shown in FIG. 2. At this time, assuming that the same window number later described is allocated to processing units of the panels A and B, the panels A and B output the quite identical screen. As the case in which the panels A and B output the identical screen, one is conceived, in which a customer and a teller share the same screen in performing a teller business in a bank.

Next, a window ID that is a feature of this embodiment will be described.

In this embodiment, an area making a sense collectively on an image space, of which the host system 10 is conscious, is called a window, and the window is dealt with as a unit of transfer processing for image data. The window often means a range to which an application software processing in the host system 10 reaches.

In the host system 10, a unique window ID is allocated to each window. The host system 10 manages an update of a screen for each window. If the update is necessary, update data is packetized, and the window ID is added thereto. The packetized update data is transferred. Control information relating to a position and a size of the window on the screen is also added to the packetized update data.

The panel 30 comprises a plurality of processing units, each of which is capable of processing one window ID. The panel 30 can process the plurality of windows simultaneously. The number of the processing units corresponds to the number of the windows that can be processed simultaneously.

Figure 4:
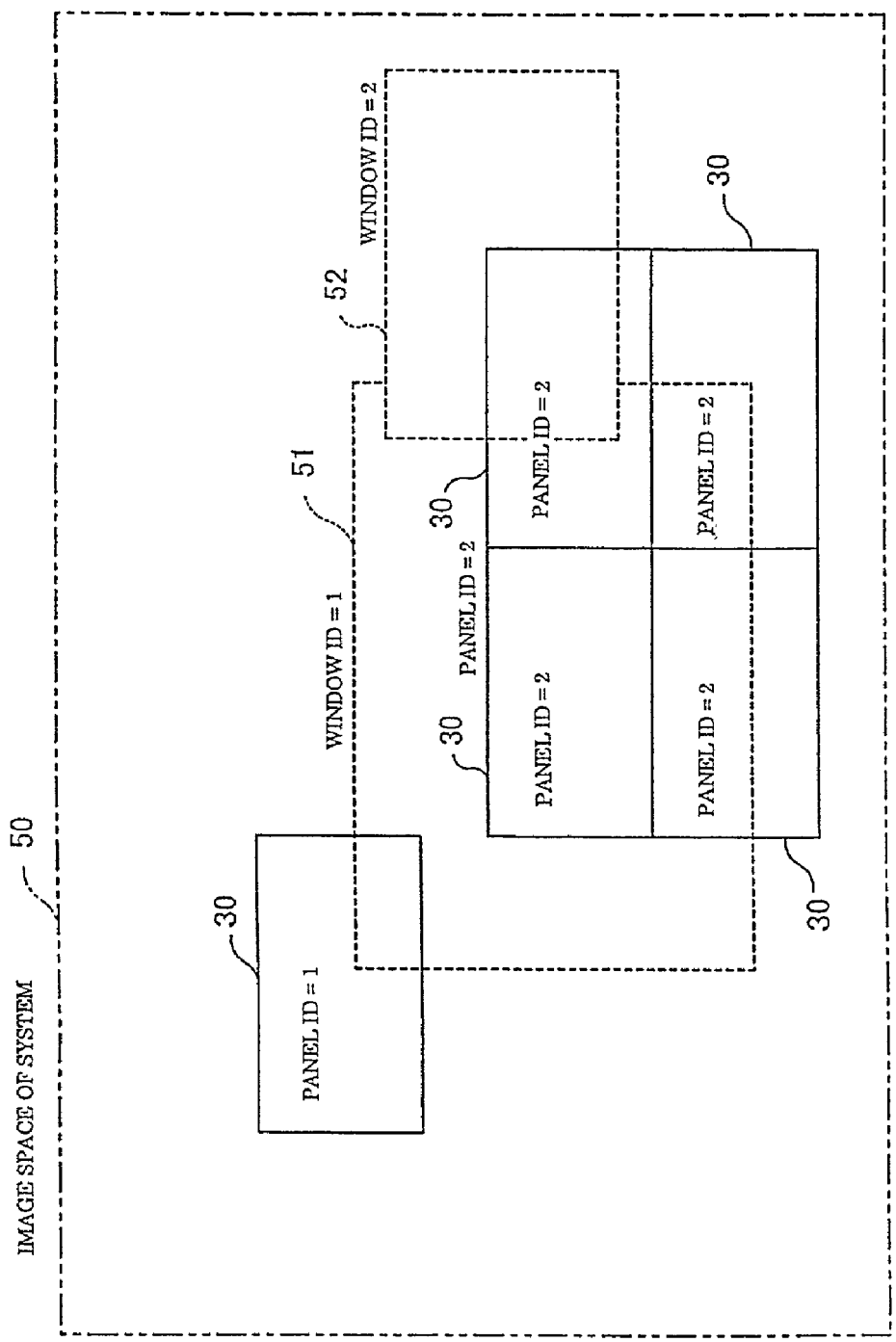
FIG. 4 is a diagram showing a correspondence example of a window ID and a panel ID in an image space.

FIG. 4 is a diagram showing an example of an image space, in which a window ID and a panel ID correspond to each other. Reference numeral 50 denotes an image space in the image display system, which can be displayed in the host system 10. A plurality of panels 30 are arranged in the image space of the image display system. A panel 30 having a panel ID: 1 is dealt with as one panel. Four panels 30, each of which has a panel ID: 2, are tiled, and have a common panel ID: 2. Before an image of the window is transferred from the host system 10, a window ID to be processed is set for the panel 30. In FIG. 4, an instruction to process a window 51 having a window ID: 1 and a window 52 having a window ID: 2 is sent to the panel 30 having the panel ID: 1 and the panel 30 having the panel ID: 2 through a command. Here, when image information having the window 51 of the window ID: 1 is transferred together with the window ID information in the form of a packet, each panel 30 executes an access only to a management area of itself based on a range of the window 51 and a display range of each panel 30. A handler later described has priority information indicating an upper/lower relation at the time when the windows overlap, besides the window ID.

Figure 5:
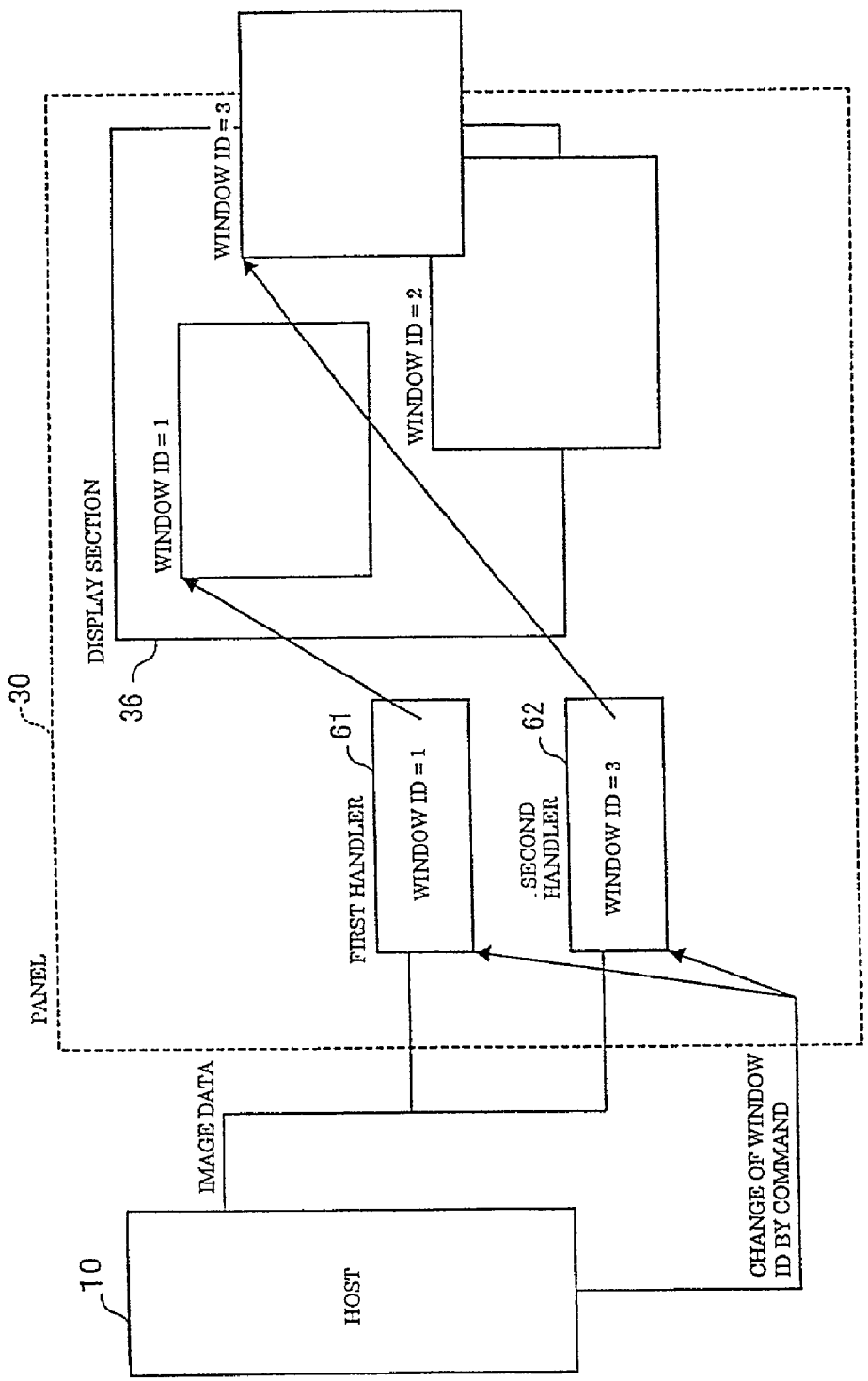
FIG. 5 is an explanatory view for explaining contents of handlers placed in a panel.

FIG. 5 is a diagram for explaining contents of the handler placed in the panel 30. Here, the handler means a processing unit for processing one window. FIG. 5 shows a situation where two handlers are, for example, provided for one panel 30. It is assumed that the first and second handlers 61 and 62 are set so as to be in charge of processing the window of the window ID: 1 and the window of the window ID: 3. Image data from the host system 10 is packetized, and the window ID is added to each packetized image data. When it is decided that the window IDs in the packetized image data are the ones of windows to be processed by the first and second handlers 61 and 62, the first and second handlers 61 and 62 execute processing for the windows, and update a screen for a display space of a display section 36 in the panel 30. In the setting shown in FIG. 5, the window having the window ID: 2 is not processed. For this reason, the image display system of this embodiment is constructed such that the first and second handlers 61 and 62 are set so as to process the window of the window ID: 2 after changing the settings of the first and second handlers 61 and 62, and a packet of the window ID: 2 is sent. The number of the handlers is optimized in consideration of the number of the windows that must be processed simultaneously. When one panel 30 is processed by a plurality of processing chips 31, a handler of each processing chip 31 has a common window ID. Similarly, when the panels 30 are tiled, all the panels 30 constituting the tiling have a common window ID.

In order to further facilitate to understand the foregoing image transfer, a packet transfer in this embodiment will be briefly described with reference to FIG. 6.

Figure 6:
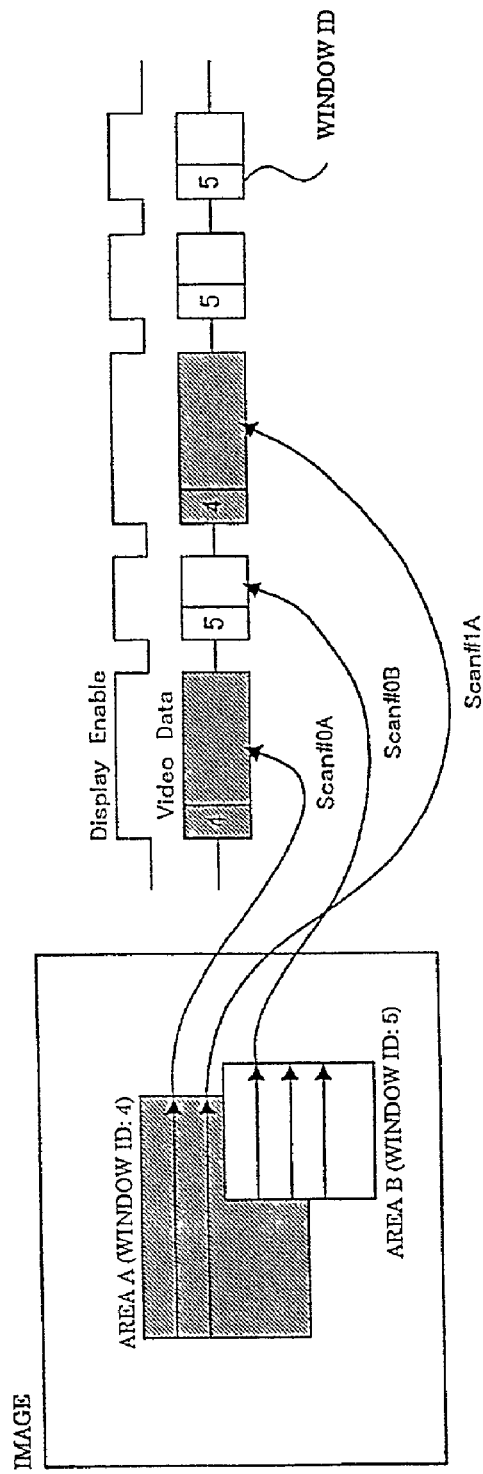
FIG. 6 is an explanatory view for explaining a packet processing system for transferring image information from a host system to a panel.

FIG. 6 is a diagram for explaining a processing method in which a packet is outputted from the host system 10 to the panel 30 side. It is now assumed that an area A and an area B exist as images generated by an application software on the host system 10 side. In this embodiment, development operation of the image is not executed on the host system 10 side, but executed on the panel 30 side. In the host system 10, for example, a window ID: 4 is set for the area A, and a window ID: 5 is set for the area B. A transfer of image information to the panel 30 side is executed with a packet method in which the image information is sorted for each area. To be more specific, an image signal is transferred by packetizing the image signal correspond to a Display Enable signal, for example, for each scan. ID information indicating a window ID is added to each packetized image signal, and then the packetized image signal is transferred. If the foregoing handlers in the specified panel 30 are set so as to process the window ID: 4 and the window ID: 5, the image information, which is transferred in the form of a packet and to which the window ID is added, can be developed on a specified panel.

Next, a command between the host system 10 and a display (the plurality of panels 30) will be described.

Changes of a panel ID, a window ID in a handler and a panel attribute are executed by a command from the host system 10 to the plurality of panels 30. The host system 10 reads out error information relating to video data transferred from the plurality of panels 30. In this embodiment, to support the multi-panel, the following commands are provided.

(1) Setting of panel ID: A panel ID of an objective panel 30 is changed. Immediately after a power is turned on, all of the panels 30 have a panel ID: 0. Accordingly, the value of the panel ID is changed to the one other than "0."

(2) Setting of origin of panel: A displayed position of an objective panel 30 is changed. The displayed position is set at any place in the image space 50 of the host system 10.

(3) Setting of window ID for handler: A window ID to be processed by each panel 30 is set for each handler.

(4) Setting of a window priority for a handler: A priority is set when windows of which a handler is in charge are overlapping.

(5) Reading-out of error information of window: After image data having a certain window ID is transferred, whether or not a transfer error occurred is read out. Since a window may overstride a plurality of chips and a plurality of panels, a logical sum is made for results of reading-out for all chips having objective window IDs.

(6) Reading-out of error information of panel: Whether or not a transfer error of data occurred in an objective panel 30 is read out. When the panels 30 are tiled, a logical sum of transfer error information in all constituent members (panels 30) is read out.

(7) Reading-out of operation state of panel: An operation state of an objective panel 30 is read out. A newly added display panel 30 includes bits indicating that the newly added display panel exists.

(8) Reading-out of constitution information of panel: Constitution information of the panel 30 stored in the nonvolatile memory 32 is read out.

(9) Change of constitution information of panel: Change of a constitution information such as tiling is stored in the nonvolatile memory 32.

Next, reading-out of constitution information (display information) of the panel 30 will be described. Here, FIGS. 7 to 10 are diagrams for explaining setting of a panel ID for the panels A, B, C and D and reading-out of the constitution information in the order of processing procedures.

To read out constitution information (attribute information) of the panel 30 (display device) connected to the host system 10 and to execute the most suitable setting operation for an operation, the panel 30 stores various attributes of a display in its nonvolatile memory 32 and responds to reading-out from the host system 10. In this embodiment, the reading-out of the attribute information is performed based on EDID information defined by Video Electronics Standard Association (VESA). Under circumstances in which a plurality of panels 30 are connected to each other, the reading-out of the attribute information from all of the panels 30 are made to be possible by introducing the following rule and mechanism.

Figure 7:
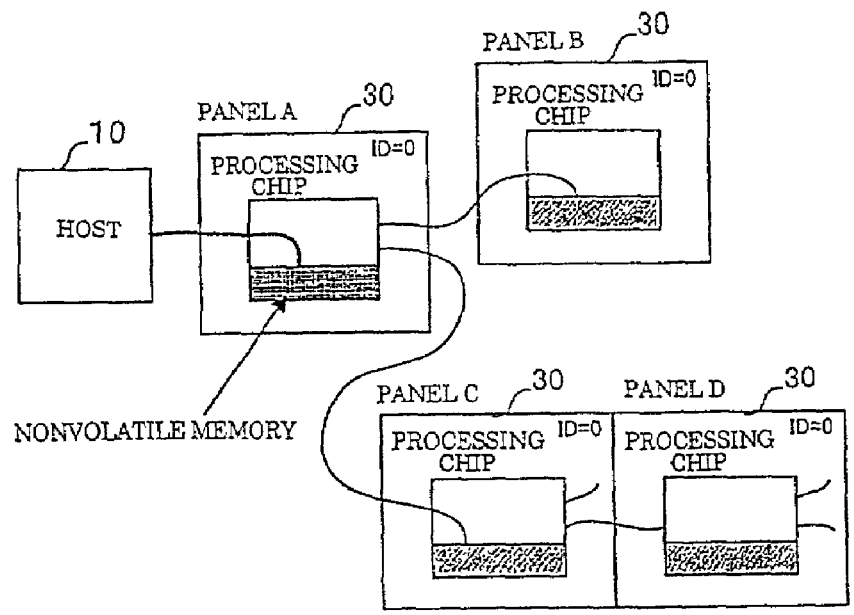
FIG. 7 is a diagram for explaining setting of panel IDs and reading-out of constitution information for panels A, B, C and D in the step order.

A flow of the reading-out operation of the display information will be described with reference to FIGS. 7 to 10. In this embodiment, only the panel 30 having the panel ID: 0 shall have a right to respond to the reading-out of the attribute information. For this reason, all of the panels 30 have the panel ID: 0 immediately after the power source is turned on, as shown in FIG. 7. Panels 30 having an ID other than "0" function to select one of the plurality of panels 30 connected to the downstream and to transfer the information to the upstream (toward the host system 10 side). After the host system 10 reads out the attribute information, the panel ID of the panel 30 shall be set to the one other than "0" by a command. At this time, the panel 30 having the panel ID: 0 inhibits the panel ID command from the host system 10 to be sent to the downstream panel 30, and thus prevents other panels 30 from undergoing a setting of a panel ID carelessly. In other words, in FIG. 7, the attribute information stored in the nonvolatile memory of the panel A is being read out, and the command is not transferred to the panel 30 located at the downstream of the panel A until the panel A undergoes the setting of the panel ID.

Figure 8:
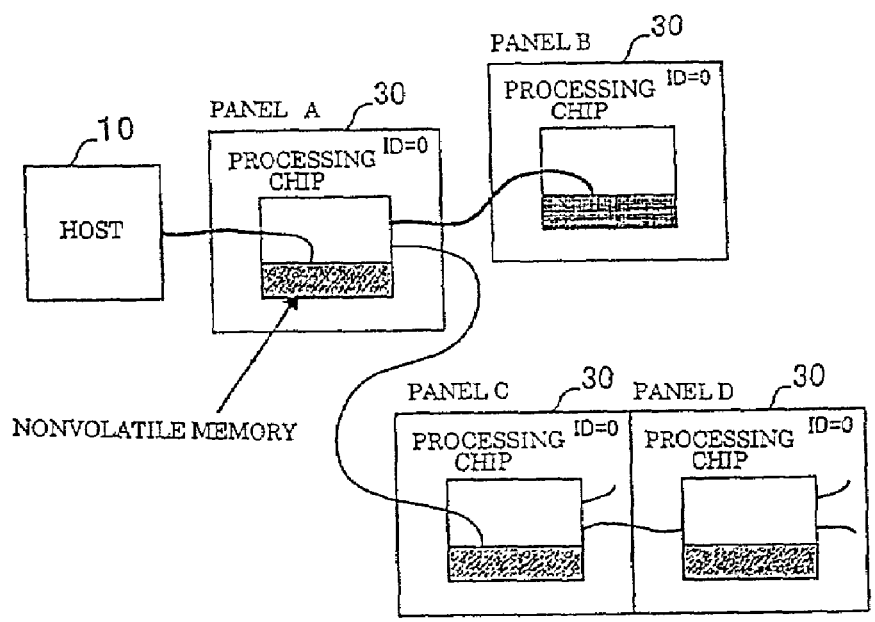
FIG. 8 is a diagram for explaining setting of panel IDs and reading-out of constitution information for panels A, B, C and D in the step order.

Thereafter, as shown in FIG. 8, the panel ID of the panel A is set to, for example, "1", and hence the panel ID thereof becomes the one other than "0". Thus, the panels B and C connected to the panel A can be accessed.

When the panel 30 having the panel ID other than "0" selects one of the panels 30 which are connected to the downstream of the former panel 30, an I²C bus data line adopting a serial transfer system is examined. In this embodiment, a DDC terminal to which the panel 30 is not connected is pulled up, and the panel 30 is designed such that its panel ID is normally "1". Therefore, a panel 30 which first outputs "0" is selected as a next candidate. In the example of FIG. 8, of the panels B and C connected to the panel A, the panel B shall output "0" earlier than the panel C. As a result, the panel B is selected, the reading-out of the attribute information in the nonvolatile memory is executed. Furthermore, when "0" is inputted from two panels 30 or more simultaneously, one panel 30 is selected according to a priority fixed in each panel 30.

A path to the panel 30 that is once selected is held until a command for setting the panel ID is terminated. Specifically, as shown in FIG. 8, a path to the panel 30 selected by the panel A is held until the panel ID of the panel B is set. With such constitution, among many panels 30 having the panel ID: 0, it is possible to selectively change a panel ID of a panel 30 from which the attribute information is read out in advance. By the command for setting the panel ID, the selected path is fully canceled, and a new panel 30 for which a panel ID is not yet set is selected.

Figure 9:
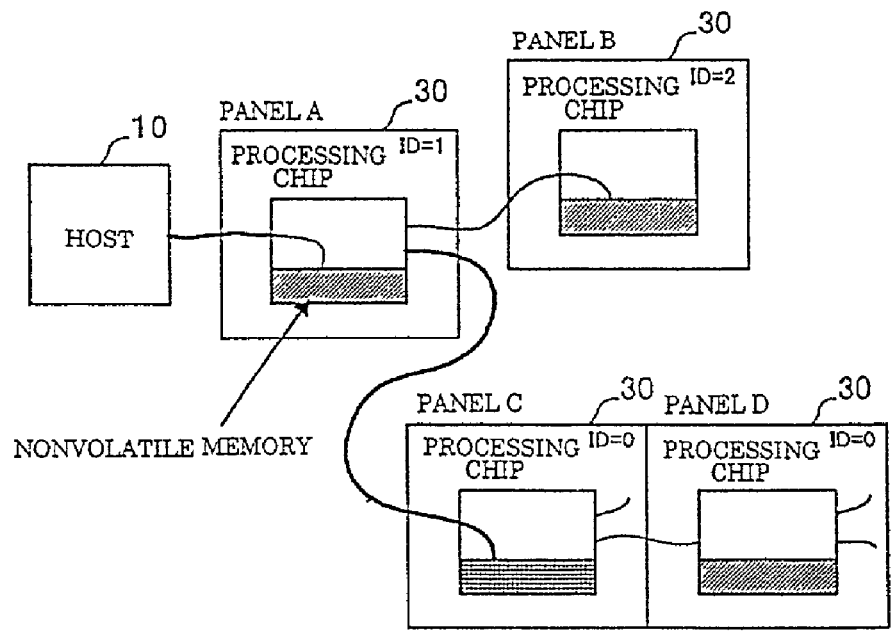
FIG. 9 is a diagram for explaining setting of panel IDs and reading-out of constitution information for panels A, B, C and D in the step order.

FIG. 9 shows a situation in which after the panel B is set to the panel ID: 2, the panel C that outputs "0" is selected by the panel A.

Figure 10:
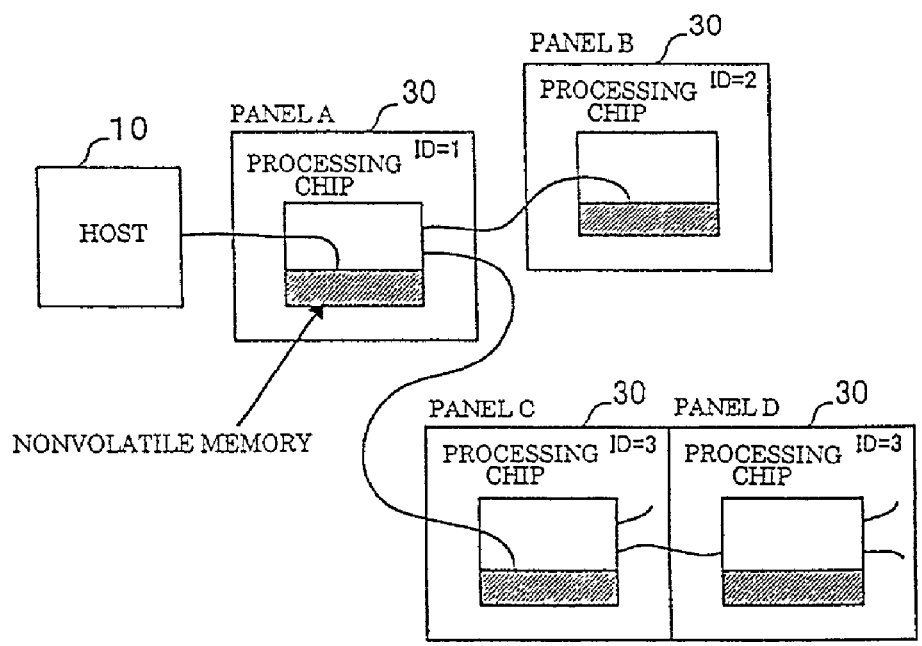
FIG. 10 is a diagram for explaining setting of panel IDs and reading-out of constitution information for panels A, B, C and D in the step order.

When the plurality of panels 30 are tiled, a panel 30 which is in charge of sending its attribute information to the host system 10 has the foregoing TiledMaster bit set to "1". To be more specific, among the tiled panels forming a group, the panel 30 positioned at a location closest to the host system 10 is in charge of sending its attribute information to the host system 10. In FIG. 9, the TiledMaster bit in the panel C is set to "1". When the panels 30 are tiled, a command from the host system 10 to set the panel ID is sent to the panels 30 on the downstream without being blocked, and it is facilitated that all of the panels 30 tiled have the same panel ID. In the panel 30 in which the foregoing TiledLast bit is set to "11", a command from the host system 10 is blocked similarly to the case where the panels are not tiled. In FIG. 9, the panel C and the panel D are tiled, and the panel C provides attribute information as a representative of a virtual panel tiled. This attribute information includes another attribute information as the tiled virtual panel besides attribute information as a single panel. A command for setting a panel ID operates on the panels C and D, and the panels C and D have the same panel ID. As a result, for example, the same ID: 3 is set to the panels C and D as shown in FIG. 10.

When even one bit indicating "0" could not be read out in spite of trying to read out the setting information, it is said that the setting information of all of the panels 30 was read out. To be more specific, since no panel 30 exists on the downstream of the panel D in FIG. 10, this means that the host system 10 cannot read out even one bit indicating "0".

The basis for a fact that the reading-out in all of the panels 30 can be performed with such a method is that the DDC terminal which is not connected to any panel inputs normally "1" by a pull-up resistor. To be more specific, an input of "0" is a proof that a panel 30 connected to the DDC terminal exists. In the case where all of the panels 30 are examined, the enormous number of panels 30 must be examined and much time is required for the examination. On the contrary, according to this constitution, the panels 30 connected to the DDC terminal can be read out with a very little labor.

Figure 11:
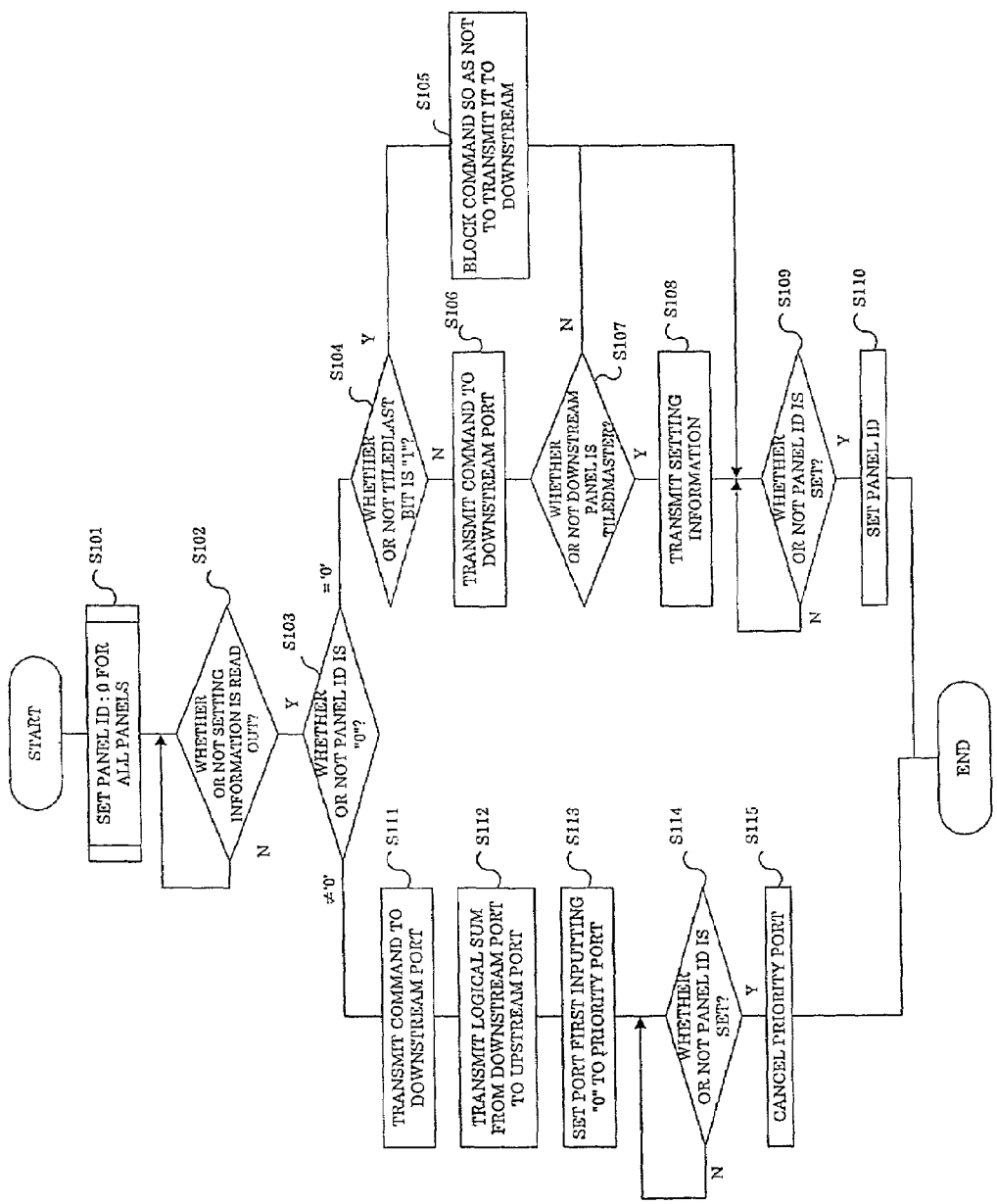
FIG. 11 is a flowchart showing a flow of reading-out processing of display information.

As described above, the display information is read out in the above described manner. For confirming the above-described matter, processing procedures will be described again by using the flowchart shown in FIG. 11. In this embodiment, immediately after the power source is turned on, all of the panels 30 have panel ID: 0 (step 101) to stand by for the reading-out of the setting information (step 102). When the setting information is read out, procedures to be executed are determined depending on a state of the panel ID (step 103). Specifically, when the panel ID is "0", a state of the TiledLast bit is monitored (step 104). If the TiledLast is "Y", that is, if the TiledLast bit is set to "1", the panel from which the panel ID is read out is the last one among panel group tiled. Accordingly, the command is blocked so that the command is not transmitted to the downstream (step 105), and the procedure advances to the setting of the panel ID in step 109.

If the TiledLast is "N", that is, if the TiledLast bit is set to "0" (step 104), the command is further transmitted to the downstream port (panel 30) (step 106). Next, it is decided whether or not the panel 30 on the downstream to which the command is transferred is the TiledMaster of the panel group tiled (step 107). If the TiledMaster is "N", that is, if the TiledMaster bit is set to "0", the procedure advances to the setting of the panel ID (step 109). On the other hand, if the TiledMaster is "Y", that is, if the TiledMaster bit is set to "1", the setting information including the attribute information is transmitted to the host system 10 (step 108). Thereafter, the setting of the panel ID is waited for (step 109), and the panel ID is set (step 110), and a series of the procedures is terminated.

On the other hand, when it is decided that the panel ID is not "0", the command is transferred to the downstream port (panel 30) (step 111). To confirm a later-described plug&play function, a logical sum of data from the downstream ports is transmitted to the upstream (step 112), and a port which first sends out "0" is set to a priority port (step 113). Next, the setting of the panel ID is waited for (step 114), and the setting of the priority port is canceled (step 115). Thus, a series of the procedures is terminated.

As described above, according to the reading-out of the display information in this embodiment, the panel ID needs not to be determined invariably from the beginning, and the panel ID can be dynamically changed afterward. Specifically, a panel ID different from the one which was given for the first time can be given afterward freely, and the position of the panel corresponding to the panel ID can be recognized according to the attribute read out. Furthermore, if the image display system of this embodiment is constituted so that all of the panels are examined by the host system, the enormous number of verifications must be performed depending on the number of panels connectable, and an extensive time for the verifications is required. According to this embodiment, it is possible to give the panel ID to the panel dynamically and to read out the display information from the panel.

Next, the plug&play function in this embodiment will be described.

In this embodiment, when an operation of the display is begun after completion of the setting operation, the host system 10 issues a command periodically, and checks whether or not a new panel 30 is added, or whether or not a panel 30 is detached. To perform such operations, the host system 10 issues via the CCD terminal a command to confirm that a specified panel 30 is continuously operating.

The specified panel 30 changes a bit, which indicates that it is active, to "0" so as to respond to the reading out. The panels 30, which are not specified, transfer simply the data read out from the downstream to the upstream. Since the specified panel 30 is one, the bit indicating that the panel is active is transferred by obtaining a logical sum of information in the plurality of panels 30 in the downstream. Specifically, if an input from any panel in the downstream is "0", "0" is transmitted to the upstream.

A bit which can be used by a newly added panel 30 for notifying that it is newly added shall be provided in other bits of data simultaneously transferred. Also this bit is logically ORed in each panel 30 and transferred therethrough. Since the command for examining that the panel 30 is active is periodically issued, the panel 30 newly added responds to the host system 10 by sending out "0", at the timing of issuing the command, to the position indicating that the panel 30 is newly added.

Figure 12:
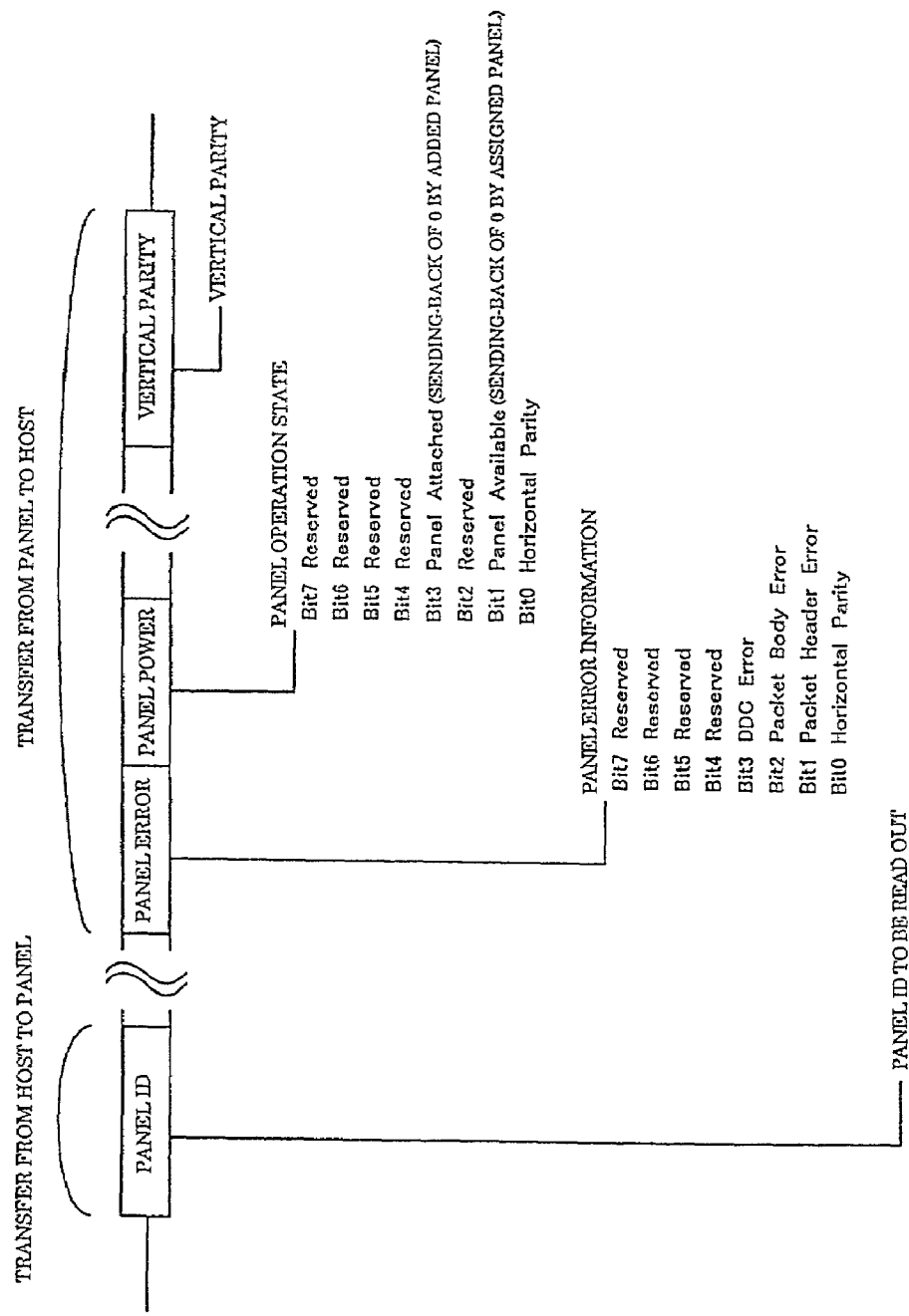
FIG. 12 is a diagram showing a format example for realizing a plug&play function.

FIG. 12 shows a format example for realizing this plug&play function. Referring to FIG. 12, Panel-ID is a command used for specifying a panel ID to be read out at the time of a transfer from the host system 10 to the panel 30. Panel Error is a command indicating various kinds of panel error information at the time of a transfer from the panel 30 to the host system 10. Furthermore, Panel Power command, and Vertical Parity command indicating a vertical parity information at the time of the transfer from the panel 30 to the host system 10 are provided.

This Panel Power command is a command used in transferring a panel operation state to the host system 10. A Panel Available bit (bit 1) in this Panel Power command is used, and this bit is sent back to the host system 10 after setting it to "0". Thus, it can be shown that the specified panel 30 is not cut off. When a newly added panel 30 exists, the newly added panel 30 changes a Panel Attached bit (bit 3) to "0", and transfers it to the host system 10. Thus, the host system 10 can recognize the existence of the added panel.

According to the plug&play function of this embodiment, it is possible to detect the added panel and the deleted panel without using an exclusive line. In other words, processing performed at the time of the connection and cutting-off of the display device in the state where the system is operated is called plug&play or plug&display, and these plug&play and plug&display require an exclusively used detection line. However, according to this embodiment, these functions can be achieved using a control line used for other controls.

Figure 13:
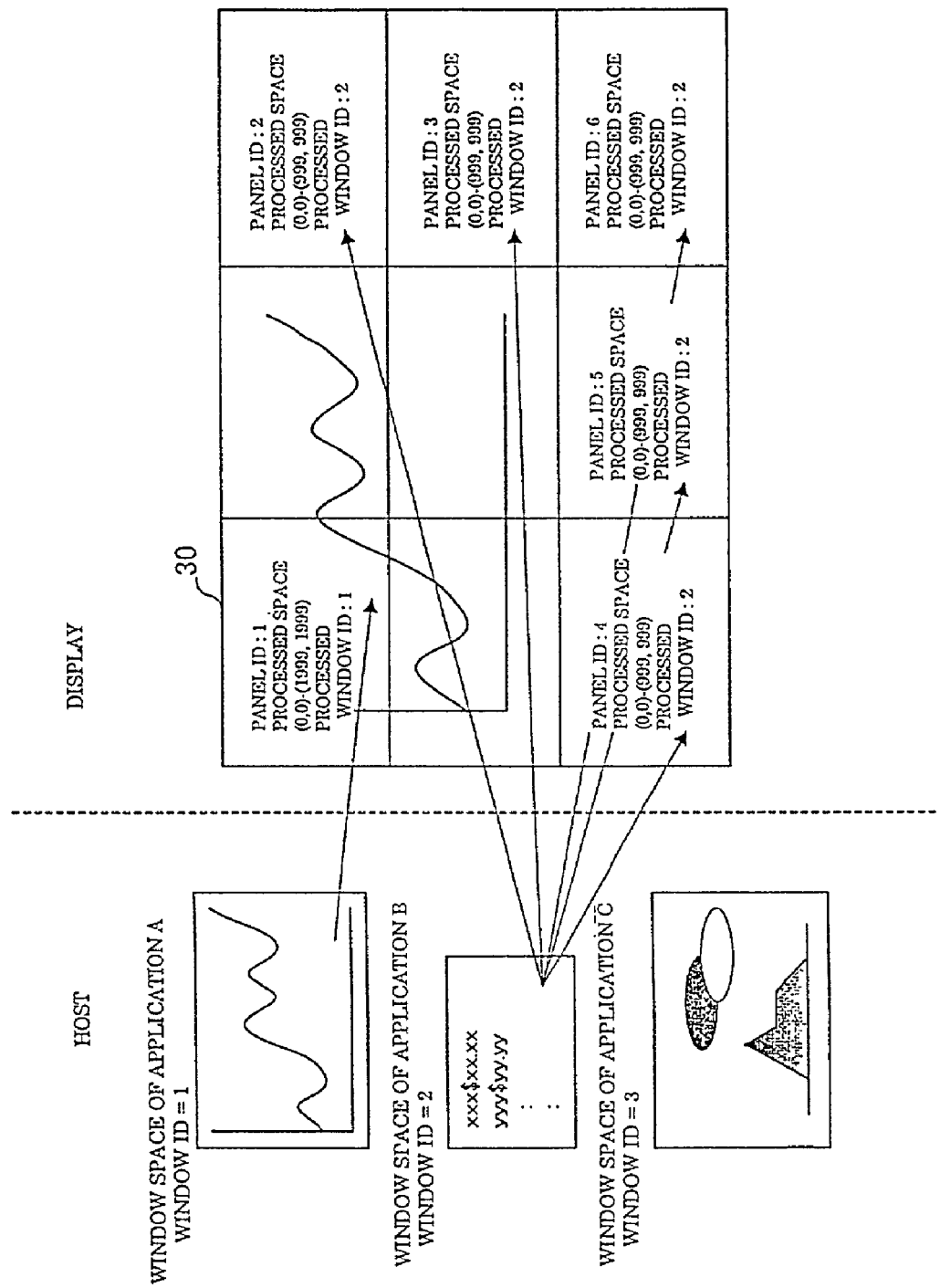
FIG. 13 is a diagram showing an example of an application using an embodiment of the present invention.

An example of an application used in this embodiment will be described with reference to FIGS. 13 and 14. FIG. 13 shows an example of an application in which nine panels 30 are spread. In FIG. 13, four panels 30 to which a panel ID: 1 is allocated are tiled. For the four panels 30 to which the panel ID: 1 is allocated, continuous numbers such as (0, 0) to (1999, 1999) are set as a processing space. In this example, the panel ID: 1 is set so as to process a window ID: 1, and a window space such as a graph showing a stock price is displayed, which the application A outputs.

Incidentally, the panels having the panel ID: 2 to the panel ID: 6 are dealt with a single panel, respectively. These single panels have a processing space starting from (0, 0), respectively. Here, if all of the panels having the panel ID: 2 to the panel ID: 6 are set so as to process the window ID: 2, spaces outputted by the application B are simultaneously displayed for all of the panels having the panel ID: 2 to the panel ID: 6. On the other hand, if by controlling the handler of the panels having the panel ID: 2 to the panel ID: 6, the setting is made so that only the panel having the panel ID: 2 processes the window ID: 2, only the panel having the panel ID: 2 displays the image of the application B. Next, if the panel having the panel ID: 3 is set to process the window ID: 2, it is possible to allow the panel having the panel ID: 3 to display the image of the application B. In such a manner, the images, for example, a stock price for each brand, can be subsequently displayed on the panels having the panel ID: 2 to panel ID: 6.

Figure 14:
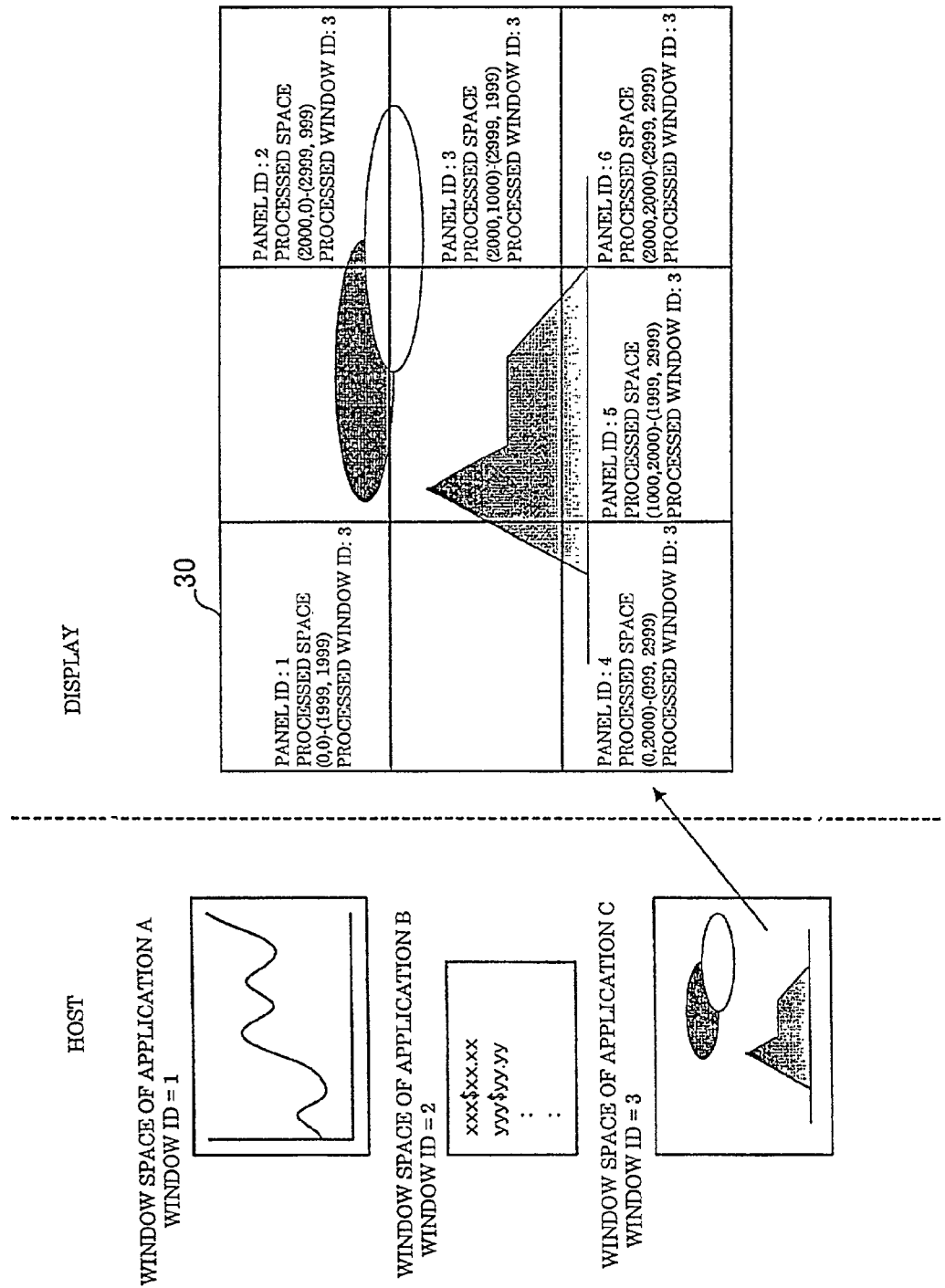
FIG. 14 is a diagram showing an example of an application using an embodiment of the present invention.

Also in FIG. 14, nine panels 30 are spread similarly to FIG. 13. However, processing spaces in FIG. 14 differ from those in FIG. 13. The panels are set so as to have processing spaces of coordinates continuous with those adjacent panels. To be more specific, the panel having the panel ID: 2 has coordinates (2000, 0) to (2999, 999) which is continuous with those of the adjacent panel. The panel having the panel ID: 4 has coordinates (0, 2000) to (999, 2999) which is continuous with those of the adjacent panel. As a result, although the display composed of the nine panels 30 has a group of the four tiled panels 30 and the five single panels 30, a continuous image can be displayed by use of all of the nine panels 30 by contriving to set these processing spaces. With such structure, if an instruction to process, for example, the window ID: 3 shown in FIG. 14, is issued to all of the panel IDs, an image of the application C is displayed by using all of the panels 30 as shown in FIG. 14.

In the above, for the sake of convenience, the description was made to the case where the multi-panel is constituted by collecting the single panels 30 in such a manner that the single panels 30 are tiled to form one panel 30.

However, the present invention is not limited to this embodiment, and for example, sub-panels obtained by dividing a high-resolution panel into plural pieces can be conceived, and use of these sub-panels can be conceived as a single panel 30 in this embodiment. For example, in the application example using the nine panels 30 described in FIGS. 13 and 14, the whole of the nine panels 30 forms one high-resolution panel, and each sub-panel of this high-resolution panel will correspond to the panel 30. In such case, each sub-panel has a panel ID, and each sub-panel may execute a display operation similarly to the above-described panels 30 based on an instruction from the host system 10. However, in the case where one high-resolution panel is divided into a plurality of sub-panels, it is not always necessary that each sub-panel has the nonvolatile memory 32 shown in FIG. 1. Instead of providing the nonvolatile memory 32 in each sub-panel, it is possible to cope with the formation of the multi-panel by providing, for example, one nonvolatile memory 32 and a plurality of processing chips 31 as a driving mechanism.

The descriptions for this embodiment of the present invention were made in detail as above. In order to achieve the technologies adopted in this embodiment, it is the most effective to apply a technology to execute processing concerning the image display by the host system 10 and the panel 30 individually and a technology to transfer packetized data between the host system 10 and the panel 30 to this embodiment.

As the former technology, a technology is given, in which a frame memory that has heretofore been provided on the host system 10 side is provided on the panel 30 side, and processing such as development of an image and refreshing thereof are executed on the panel 30 side. As the later technology, a technology is given, in which an image scan signal is transferred for each area of a window.

In the technology of individually executing the processing concerning the image display by the host system and the panel and in the technology of transferring the packetized data, it is possible to determine information to be managed in accordance with levels of the window, the panel and the chip and processing for them, by adopting this embodiment. As a result, it is possible to realize driving even for a high-resolution panel without an effort, and a constitution of a multi-panel by combining a large number of single panels can be easily achieved.

Next, another application example in this embodiment will be described.

In the conventional transfer technology without using packet transfer, specifically, to an image data transfer in a so-called native mode, in which a total screen is transferred by each refresh time without packetizing the image data, this embodiment of the present invention can be applied. To be more specific, a first function to display a display image in any location with any magnification in the native mode is provided, and the host system 10 starts and stops to transfer an image signal to the panel 30, thus a fine image can be displayed on a high-resolution panel by divisionally displaying.

In the so-called native mode, a resolution is set in accordance with a capability of a PC on the host system 10 side. As the resolution, there are, for example, a Video Graphics Array (VGA) (640×480 dots) capability and an Extended Graphics Array (XGA) (1024×7168 dots) capability. When images having these resolutions are displayed on a high-resolution panel exceeding a resolution capability on the host system 10 side, displaying on the high-resolution panel is generally tried by performing scaling and centering.

However, in the foregoing first function on the panel 30 side, by using the processing mechanism (handler) of the window in this embodiment, which was introduced in the packet transfer processing, it is possible to display an image in the conventional mode on any location of the high-resolution panel with any magnification. This display technology differs from the technology for displaying a packet-based image in an extended mode in that information relating to a display location and a magnification is not sent in the form of packet but is set in the handler of the panel controller. For this setting, a command via the DDC terminal described in FIG. 1 can be used. Specifically, the multi-panel can be constituted via the DDC terminal by using the panel ID, and arrangement information in the image space can be changed by sending a command. A video signal (image signal) can be displayed on the multi-panel without being packetized, while showing a large image.

In addition to the first function on the panel 30 side, in a second function, which a host system 10 showing a resolution of an image which can be outputted to an ultra high-resolution panel is connected, the resolution being not so high, it is conceived to divisionally display an image on the whole of the ultra high-resolution panel. For example, a display position of the image is horizontally stepped first from the upper left, and stepping is repeated from the upper portion of the screen to the lower portion thereof. The host system 10 shall output the image signal with the maximum resolution of itself. If the resolution of the panel 30 is higher than that of the host system 10, the image must be sent by magnifying it or dividing the display area. In any case, sending-out of the image must be stopped before a subsequent operation starts and after the host system 10 just finishes to send out the image equivalent to one screen. A suitable subsequent display position is set by a command via the DDC terminal, and thereafter an output of the video signal is resumed.

With the first and second functions, it is possible to display a fine image by divisionally displaying the image even in the case where the image is displayed on the high-resolution panel showing a resolution exceeding that of the PC on the host system 10 side in the native mode.

Furthermore, also in the native mode, it is possible to separate the panels 30 from others while displaying the image. This function is naturally achieved by stopping the transfer of the packet after the image transfer in the foregoing extended mode, and achieved by stopping processing on the host system 10 side in the native mode.

As an application example by this function, there may be a case in which a panel 30 having a size of a postcard is connected to a host system 10, a photoimage is outputted, and, thereafter, the panel 30 is separated from the host system 10, thus placing the panel 30 as a photostand. Moreover, various kinds of applications can be conceived, such that a high-resolution panel is hung so as to display a famous picture, and when the picture is wished to be changed to another, a PC is connected to the panel, thus rewriting the picture.

In this embodiment, the descriptions were made using a liquid crystal display device (LCD) as the display device. As a matter of course, this embodiment can be applied to other displays such as CRT, PDP and LED. In the case where an enlarged display is performed by combining a plurality of panels 30, a display such as LCD having a narrow frame is especially desirable. Furthermore, since a technical innovation in the LCD is remarkable, the LCD is excellent when one panel is theoretically divided and managed as a group of sub-panels.

As described above, according to the present invention, the same operation can be executed regardless of the number of connected panels (sub-panels) even under the multi-panel environment.

In the present invention, the tree-shaped multi-panel that was not able to be realized by the prior arts is achieved, and a dynamic re-layout of panels (sub-panels) can be performed.

Furthermore, a display attribute is read out from the multi-panel in which each panel is cascade-connected or tree-connected, and the multi-panel is automatically constituted by means of a system without performing special setting for the individual display devices.

When the high-resolution panels are divisionally processed by a plurality of driving mechanisms, the driving mechanism serving as a master controls other driving mechanisms, and hence the panels are made to look like a single display device from the host system. Accordingly, it is possible to execute processing unconscious of the multi-panel.

Although the preferred embodiments of the present invention have been described in detail, it should be understood that various changes, substitutions and alternations can be made therein without departing from spirit and scope of the inventions as defined by the appended claims.

What is claimed is:

1. A host device for controlling the display of a portion of an image space in at least one panel connected thereto, comprising:
   a panel ID recognition section for recognizing a panel ID for a unit comprising a single display panel or a predetermined number of display panels for displaying said portion of the image space;
   a window ID allocation section for allocating a window ID for a window constituting a unit for transferring an image signal;
   a control signal output section for outputting a control signal for setting said window ID to be processed by said unit having said panel ID; and
   an image signal transfer section for adding said window ID to said image signal and transferring said image signal to said unit having said panel ID.

2. The host device according to claim 1, wherein said control signal output section outputs setting information of a processing space that is information relating to a display area to be processed for each unit having said panel ID or for a plurality of selected units having said panel ID.

3. The host device according to claim 2, wherein said setting information, which is outputted from said control signal output section, is to provide a gap between end coordinates of a processing space and start coordinates of an adjacent display panel.

4. The host device according to claim 1, said host device further comprising a panel attribute setting section for setting a panel attribute for said panel ID, wherein said control signal output section specifies said panel ID and outputs a control signal for indicating a panel attribute set by said panel attribute setting section.

5. The host device according to claim 1, wherein said image signal transfer section manages an update of a screen for each window, packetizes an updated image signal when the update is needed, adds said window ID to said image signal and transfers said image signal.

6. The host device according to claim 1, said host device further comprising:
   a panel ID setting instruction section for instructing a setting of said panel ID to said unit comprising said single display panel or said predetermined number of display panels, wherein said panel ID recognition section recognizes said panel ID from information outputted from said panel based on an instruction by said panel ID setting instruction section.

7. A host device which transfers an image signal to a high-resolution display panel connected thereto, comprising:
   a panel ID recognition section for imagining sub-panels obtained by dividing said high-resolution display panel into a predetermined number of sub-panels and for recognizing a panel ID for a unit comprising said predetermined number of the sub-panels;

a window ID allocation section for allocating a window ID for a window constituting a unit for transferring said image signal;

a control signal output section for outputting a control signal to set said window ID to be processed by said unit having said panel ID; and an image signal transfer section for adding said window ID to said image signal and transferring said image signal to said unit having said panel ID.

8. The host device according to claim 7, wherein said control signal section outputs setting information of a processing space that is information relating to a display area to be processed for each unit having said panel ID.

9. The host device according to claim 7, wherein said image signal transfer section manages an update of a screen for each window, packetizes an updated image signal when the update is needed, and adds said window ID to said image signal, thus transferring said image signal.

10. The host device according to claim 7, said host device further comprising: a panel ID setting instruction section for instructing a setting of said panel ID for said sub-panel, wherein said panel ID recognition section recognizes said panel ID from information outputted from said high-resolution display panel based on an instruction by said panel ID setting instruction section.

11. An image display device, which is connected to a host device for transferring an image signal and displaying an image, comprising:

panel ID setting means for setting a panel ID, which is an identifier of a unit comprising at least one panel;

recognition means for recognizing a correspondence relation of said panel ID and a window ID to be processed, with respect to the window ID allocated for a window that is a transfer processing unit of the image signal; and receiving means for receiving said window ID added to the image signal, wherein the unit comprising at least one panel processes the window, based on the correspondence relation of said panel ID and said window ID.

12. The image display device according to claim 11, wherein panel control bits for allowing said host device to recognize states of the plurality of panels are provided.

13. The image display device according to claim 11, wherein said panel includes a plurality of processing units capable of respectively processing a single window.

14. An image display device, which is connected to a host device for transferring an image signal, and displays an image on a panel, comprising:

panel ID setting means for imagining sub-panels obtained by dividing said panel into a predetermined number of sub-panels and setting a panel ID, which is an identifier for at least one of said predetermined number of sub-panels;

recognition means for recognizing a correspondence relation of said panel ID and a window ID to be processed, with respect to the window ID allocated for a window that is a transfer processing unit of the image signal; and receiving means for receiving said window ID added to the image signal, wherein the at least one predetermined number of sub-panels processes the window, based on the correspondence relation of said panel ID and said window ID.

15. The image display device according to claim 14, wherein panel control bits for allowing the host device to recognize states of the sub-panels are provided.

16. The image display device according to claim 14, wherein said sub-panel includes a plurality of processing units capable of respectively processing a single window.

17. The image display device according to claim 14, wherein only one memory for storing setting information of the sub-panel set by said panel ID setting means is provided.

18. An image display system comprising:

a host system for executing an application; and a display constituted by a plurality of panels connected to the host system, wherein the plurality of panels in said display have a panel ID as an identifier, wherein said host system allocates a window ID for a window in an image space, of which the host system is conscious, adds the window ID to an image signal, thus outputting the image signal to said display, and outputs a control signal to allow the window ID and said panel ID to correspond to each other.

19. The image display device according to claim 18, wherein said host system packetizes the image signal before an image development, and outputs the packetized image signal, and the panel in said display executes a processing for developing said image signal before the image development, which is outputted from the host system.

20. An image display method which displays an image on a display based on a signal from a host system for executing an application, comprising the steps of:

setting a panel ID for identifying either a single display section or a predetermined number of display sections forming a tiling, for the plurality of display sections constituting said display;

defining a window in an image space, of which said host system is conscious;

allocating a window ID for the window;

prior to a transfer of image information, setting a window ID to be processed for said display section for which said panel ID is set; and transferring said image information after adding said window ID to said image information.

21. The image display method according to claim 20, wherein said display is an enlarged panel using a plurality of panels, and said display section constituting the display is the panels constituting the enlarged panel.

22. The image display method according to claim 20, wherein said display is a single high-resolution display panel, and said display section constituting said display is a sub-panel which is obtained by dividing the high-resolution panel and is processed.

23. The image display method according to claim 20, wherein a change of said panel ID and a change of said window ID to be processed by said display section are transmitted from said host system to said display by a command.

24. The image display method according to claim 20, wherein a common panel ID is set to all of the predetermined number of display sections forming the tiling, and a common window ID is set to all of the predetermined number of display sections.

25. A panel attribute reading-out method, in which a panel ID for identifying a display panel is set for a plurality of display panels connected to a host system for executing an application, and an attribute of the display panel is read out by the host system, comprising the steps of:

setting said panel ID to "0" for all of the display panels at the time of turning on a power source;

reading out attribute information of an upstream display panel having said panel ID "0" by said host system;

setting said panel ID of the upstream display panel having said panel ID "0" to a value other than "0" using a command for said display panel from which the attribute information is read out;

by the display panel from which the attribute information is read out, inhibiting said command from the host system from being sent to a downstream display panel; and by the display panel from which the attribute information is read out, selecting one of the plurality of display panels connected to the downstream side to read out the attribute information to said host system.

26. The panel attribute reading-out method according to claim 25, wherein said display panel having the panel ID other than "0" selects a display panel which first outputs "0," and transfers said attribute information to said host system.

27. The panel attribute reading-out method according to claim 25, wherein when "0" is outputted simultaneously from two or more of the downstream display panels to said display panel having the panel ID other than "0," one downstream display panel is selected in accordance with a priority fixed in said display panel, and said attribute information is transferred to said host system.

28. The panel attribute reading-out method according to claim 25, wherein when a plurality of display panels are tiled, attribute information is transferred from a display panel closest to said host system among the display panels tiled, and a command from said host system which sets a panel ID is sent to all of the display panels tiled without being blocked.

29. The panel attribute reading-out method according to claim 25, wherein said display panel is a sub-panel obtained by dividing a single high-resolution panel, and said panel ID is set corresponding to said sub-panel, and an attribute corresponding to the sub-panel is read out.

* * * * *